United States Patent

Zink et al.

[11] 4,364,738
[45] Dec. 21, 1982

[54] CRYSTALLINE BROMIDE OR IODIDE SALTS OF TRIAZOLE DYES FOR POLYACRYLONITRILE

[75] Inventors: Rudolf Zink, Therwil; Peter Loew, Münchenstein, both of Switzerland

[73] Assignee: Ciba-Geigy Corporation, Ardsley, N.Y.

[21] Appl. No.: 285,903

[22] Filed: Jul. 23, 1981

[30] Foreign Application Priority Data

Aug. 1, 1980 [CH] Switzerland .................. 5875/80

[51] Int. Cl.³ .................. C09B 44/18; C09B 69/6
[52] U.S. Cl. .................. 8/634; 8/654; 8/670; 8/692; 8/927; 260/157; 260/208
[58] Field of Search .................. 8/634, 692, 539, 654; 260/157, 208

[56] References Cited

U.S. PATENT DOCUMENTS 3,597,412 8/1971 Mohr et al. .................. 260/146
3,948,598 4/1976 Okaniwa et al. .................. 8/692

FOREIGN PATENT DOCUMENTS 791932 3/1958 United Kingdom .
2033401 5/1980 United Kingdom .

Primary Examiner—A. Lionel Clingman
Attorney, Agent, or Firm—Edward McC. Roberts

[57] ABSTRACT

There are described novel crystalline bromine and iodine salts of triazole dyes of the formula

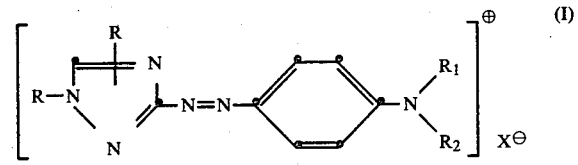

wherein
R is the $CH_3$ or $C_2H_5$ group,
$R_1$ is a $C_1$–$C_4$-alkyl group,
$R_2$ is an unsubstituted or substituted $C_1$–$C_4$-alkyl group, and
X is the bromine or iodine ion, and also processes for producing them, and their use for dyeing and printing in particular polyacrylonitrile materials.

12 Claims, No Drawings

CRYSTALLINE BROMIDE OR IODIDE SALTS OF TRIAZOLE DYES FOR POLYACRYLONITRILE

The invention relates to novel crystalline salts of triazole dyes, to processes for producing them, and to their use as dyes for dyeing and printing textile materials which can be dyed with cationic dyes.

There are known (for example from the German 'Auslegeschrift' No. 1,077,808) cationic triazole dye salts of the following structure

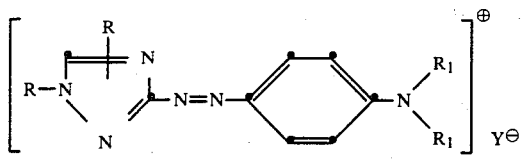

wherein R is the $CH_3$ or $C_2H_5$ group, $R_1$ is the $C_1$–$C_4$-alkyl group, and Y is Cl, $ZnCl_4$ or $CH_3SO_4$.

The processing of these known triazole dyes in the form of the chlorides or of the $CH_3SO_4$ salts leads however to difficulties with respect to isolation, since these salts occur mostly as isomeric mixtures, and do not readily crystallise, in fact not at all at room temperature. It has been suggested for this reason that they be dissolved and reprecipitated as difficultly soluble zinc chloride double salts, a procedure which however has technical and ecological disadvantages (heavy metal salts which contaminate the environment).

It was therefore the object of the present invention to produce from the said triazole dyes a salt form which would eliminate these disadvantages, that is to say, a salt form which would be free from zinc, and which would be distinguished by good crystallising properties.

It has now been found that, surprisingly, the corresponding bromine and iodine salts produce readily crystallising compounds, and thus render possible the processing of the dye suspension by simple means, such as by filtration.

The invention hence relates to triazole dyes of the formula I

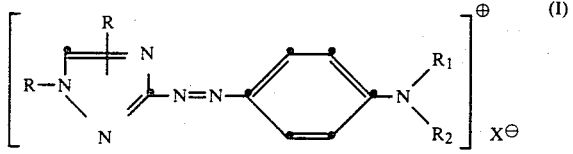

wherein
R is the $CH_3$ or $C_2H_5$ group,
$R_1$ is a $C_1$–$C_4$-alkyl group,
$R_2$ is an unsubstituted or substituted $C_1$–$C_4$-alkyl group, and
X is the bromine or iodine ion.

As a $C_1$–$C_4$-alkyl group, $R_1$ and/or $R_2$ are each for example a straight-chain or branched-chain alkyl group. They are each for example the methyl, ethyl, n- or iso-propyl group, or the n-, sec- or tert-butyl group. In the case of $R_2$, this alkyl group can be substituted. The substituents are for example: phenyl, chlorophenyl, bromophenyl, $C_1$–$C_4$-alkylphenyl, $C_1$–$C_4$-alkoxyphenyl, methoxy, ethoxy, OCO-phenyl (which can be substituted in the phenyl group by $C_1$–$C_4$-alkyl) and OCOO-phenyl.

Compounds of the formula I preferred on account of their particularly good crystallising properties are those wherein $R_1$ is a $C_1$–$C_4$-alkyl group, $R_2$ is a substituted $C_1$–$C_4$-alkyl group, and R and X have the meanings defined under the formula I.

Of particular interest are compounds wherein R is the $CH_3$ group and $R_1$ the $CH_3$ or $C_2H_5$ group, $R_2$ is a $C_1$–$C_4$-alkyl group substituted by a phenyl or benzoyloxy group, particularly by the benzyl group, and X is the bromine ion.

The triazole dye salts of the formula I are dye salts which very readily crystallise, and which are free from zinc, thus causing no ecological problems. The novel triazole dye salts of the formula I nevertheless have good solubility in water. The lower molecular weight, for example of the novel bromide salts, compared with that of the known zinc chloride double salts, has furthermore the advantage that these novel dye salts on the one hand lead to a saving in drying costs, and on the other hand give a higher dye yield, a favourable factor with regard to producing a highly concentrated commercial preparation.

These novel triazole dye salts of the formula I are produced for example by reacting for instance an alkylsulfate salt of the formula II

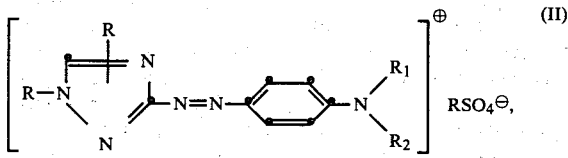

wherein the symbols R, $R_1$ and $R_2$ have the meanings defined under the formula I, in an aqueous medium, with hydrobromic acid or hydriodic acid, or with the ammonium, alkali metal or alkaline-earth metal salts thereof.

Salts of this type which can be used are for example: lithium bromide, sodium bromide, potassium bromide, magnesium bromide, calcium bromide, barium bromide, lithium iodide, sodium iodide, potassium iodide, calcium iodide, barium iodide, ammonium bromide, ammonium iodide and substituted ammonium salts, such as tetraethylammonium bromide and tetraethylammonium iodide. The stated salts can be used as an aqueous solution or in solid form.

The process is advantageously performed at room temperature, that is to say, between about 15° and 30° C.

The alkylsulfates of the formula II, which are known, are obtained for example by alkylating and quaternising, in one reaction, a triazole compound of the formula III

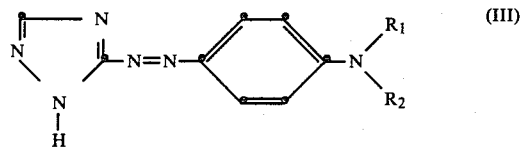

wherein $R_1$ and $R_2$ have the meanings defined under the formula I, in an aqueous medium, at room temperature, with dimethyl sulfate or diethyl sulfate.

The triazole compounds of the formula III in their turn are obtained in a known manner, for example by diazotising an aminotriazole of the formula IV

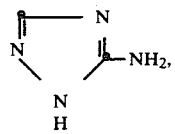 (IV)

and coupling the diazotised product to a coupling component of the formula V

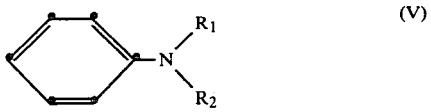 (V)

wherein $R_1$ and $R_2$ have the meanings defined under the formula I.

The novel triazole dye salts of the formula I are used as dyes for dyeing and, with the addition of binding agents and solvents, for printing materials dyeable with cationic dyes, especially textile materials, which consist for example of homo- or copolymers of acrylonitrile; or synthetic polyamides or polyesters which are modified by acid groups. In addition, the novel cationic dye salts are used for dyeing wet tow, plastics materials, leather and paper. Dyeing is preferably performed from an aqueous, neutral or acid medium by the exhaust process, if necessary under pressure, or by the continuous process. The textile material can be in the widest variety of forms, for example in the form of fibres, filaments, fabrics, knitwear, piece-goods and finished products.

It is possible by application of the dyes according to the invention to produce very deeply coloured red dyeings and printings, which are distinguished by very good general fastness properties, such as fastness to light, decatising, washing and perspiration.

Except where otherwise stated in the following Examples, 'parts' denote parts by weight, percentages are by weight, and temperature values are in degrees Centigrade. By isomeric mixture is meant a mixture containing a dye salt with a triazole radical of the formula (a)

(a) 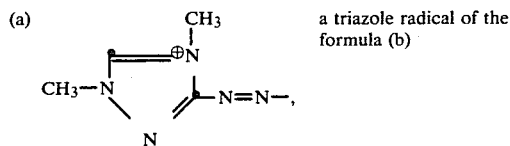 a triazole radical of the formula (b)

(b) 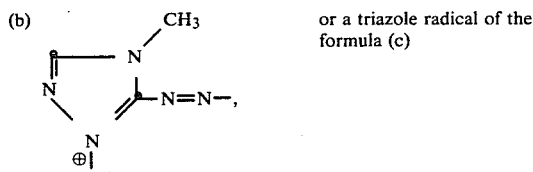 or a triazole radical of the formula (c)

(c) 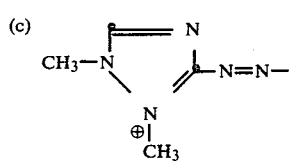

EXAMPLE 1

(a) 15.5 g of 3-amino-1,2,4-triazole are diazotised in the usual manner, the diazotised product is coupled to 36.4 g of N-benzyl-N-methylaniline, and the formed azo dye is filtered off.

(b) The moist filter cake obtained under (a) is suspended in water, and water is added to bring the total volume up to 230 ml. 15 ml of 10 N sodium hydroxide solution are subsequently added with stirring; the temperature is then lowered to 10°, and 62.5 g of dimethyl sulfate are added. The pH-value is held at 4-6 for 5 hours by the addition of abut 30 ml of 10 N sodium hydroxide solution, the temperature being 10°-20°. After completion of methylation/quaternisation, the dye salt/isomeric mixture is in the form of emulsion having a volume of about 330 ml.

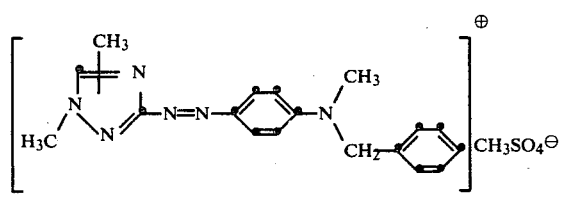

(c) The emulsion obtained under (b), volume about 330 ml, is made up to a volume of 450 ml with water. There are then added at 20°-25° 112 g of 48% hydrobromic acid, and stirring is maintained for 3 hours at room temperature, in the course of which the bromide salt crystallises out. Crystallisation can be accelerated by seed crystals. To effect complete precipitation of the product, the pH-value is adjusted to 5 by the dropwise addition of about 70 ml of 10 N sodium hydroxide solution. The dye salt/isomeric mixture of the formula

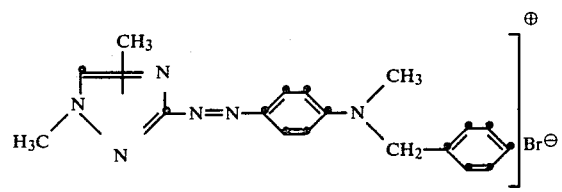

is filtered off after 1 hour, and dried in vacuo at 60°-70°. The yield is 83.7 g of dry dye, which is soluble to the extent of more than 50 g per liter of water at 30°, and which dyes polyacrylonitrile fibres in red shades having very good fastness properties.

EXAMPLE 2

(a) 330 ml of the aqueous emulsion from Example 1, (b), containing about 80 g (=about 24%) of the dye salt/isomeric mixture of the formula

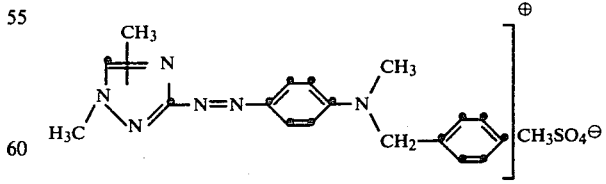

are brought to a temperature of about 50°-55°, the pH-value of the mixture being about 1.0. To the mixture are added portionwise, within 20 minutes, 60 g of anhydrous sodium sulfate, and stirring is continued for about 30 minutes at a temperature of 50°-55°. The mixture is left to stand for 1 to 2 hours at 50°-55° to effect phase separation. A dark concentrated dye solution (about 100 g) separates as the light phase. The heavy aqueous phase (about 260 ml) contains an insignificant amount of dye; it is subsequently separated through a bottom outlet. The light dye phase contains about 80% of the above dye salt, about 17% of water and about 3% of inorganic salt (mainly Na$_2$SO$_4$). That means a dye content about 3.5 times greater than that of the employed dye emulsion obtained from synthesis.

(b) The approximately 100 g (or approx. 81 ml) of the concentrated dye solution obtained under (a) are dissolved in 720 ml of water at 25°, and 48 g of solid sodium bromide are added with stirring in the course of half an hour. Crystallisation can be initiated by the addition of seed crystals. The dye salt/isomeric mixture has fully crystallised after 2 hours, and is filtered off. The yield after drying at 60°–70° in vacuo is 79.2 g of dry dye (isomers) of the formula

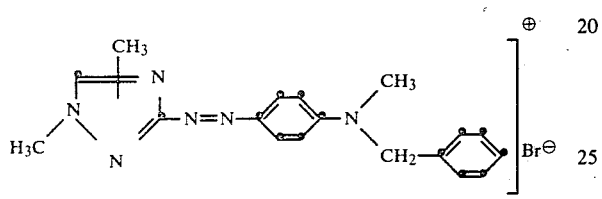

which dyes polyacrylonitrile fibres in red shades having very good fastness properties; m.p. 110°–114°: content of Br=22.0% (calculated: 19.9%).

EXAMPLE 3

(a) 60 g of 3-amino-1,2,4-triazole are diazotised in the usual manner, and the product obtained is coupled with 106 g of N,N-diethylaniline. The reaction product is filtered off.

(b) The moist filter cake obtained under (a) is suspended in water, and water is added to bring the total volume to 500 ml. There are then added 13.3 g of dimethyl sulfate at 15° to 20° within about 10 minutes, and time is allowed for the pH-value to decrease into the acid range. As soon as pH 4 has been reached, about 8 ml of sodium hydroxide solution (17%) are added until the pH value attains 6.5, and 205.7 g of dimethyl sulfate are now added within 2–3 hours, in the course of which the pH-value is kept at 6.5 with a further approx. 300 ml of 17% sodium hydroxide solution, and the temperature of the exothermic reaction at 25°–30° by the use in all of about 500 g of ice. After completion of the addition of dimethyl sulfate, stirring is maintained at pH 6.0–7.5 for 30 minutes, the temperature being allowed to rise to 40°–45°. The pH-value is thereupon adjusted to 1.5–2.0 with a small amount of hydrochloric acid (38%), the final volume being about 1300 ml.

(c) 550 ml (=about 550 g) of the aqueous dye solution obtained from synthesis (according to (b)), containing about 71 g (=13%) of the dye salt/isomeric mixture of the formula

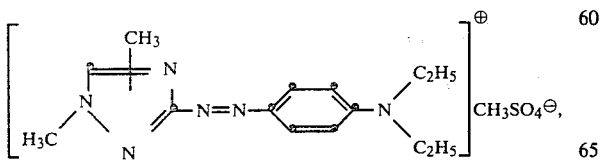

which has a pH-value of about 1.5 to 2.0, are heated, indirectly with hot water, in a separating funnel having a double wall, to 50°, and 132 g of anhydrous sodium sulfate are added portionwise within 20 minutes, stirring being continued for a further 30 minutes. The mixture is subsequently left to stand for 1 to 2 hours to effect phase separation. A dark concentrated dye solution separates as the light phase. The heavy aqueous phase contains a negligible amount of dye, and is removed via the bottom outlet. The light dye phase (weight about 135 g) contains about 38% of the dye salt of the above constitution as methyl sulfate salt and about 14% as sulfate salt, about 36% of water and about 12% of inorganic salt (mainly Na$_2$SO$_4$). This means a dye content which is about 4 times greater than that of the employed dye solution obtained from synthesis.

(d) The concentrated dye solution of 135 g, obtained under (c) are dissolved in 460 ml of water at 25°. There are then added, with stirring, 108 g of potassium iodide, and crystallisation is initiated by the addition of an amount of seed crystals. Stirring is continued for 15 hours at 20°–25°, in the course of which the dye salt/isomeric mixture of the formula

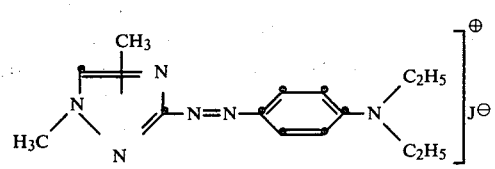

precipitates and can be filtered off. The dye is dried at 65° in vacuo to thus obtain 70 g of dry dye salt, which dyes polyacrylonitrile fibres in red shades.

EXAMPLE 4

7.1 g of the dye base of the formula

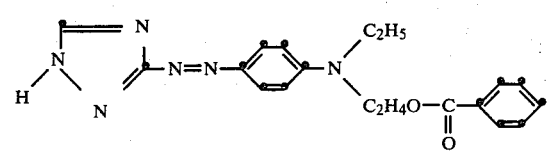

are suspended in 15 ml of water at 10° with 0.6 g of magnesium oxide, and 5.5 g of dimethyl sulfate are added. Stirring is maintained for one hour at about 15° and then for a further one hour at 20°. After completion of methylation/quaternisation, the temperature is raised to 98°; the volume is made up with water to 75 ml, and the solution is clarified by the addition at about 95° of 0.5 g of active charcoal. To the dye solution at about 40° are added 37 g of solid sodium bromide, and crystallisation is initiated with seed crystals. Stirring is continued for 2 hours at room temperature; the dye salt/isomeric mixture of the formula

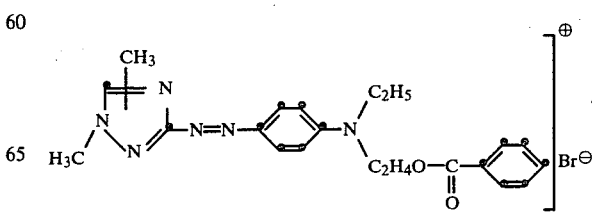

is filtered to obtain, after drying at 50° in vacuo, the dye salt in a yield of 9.2 g. This is very readily soluble in water, is not hydroscopic and produces on polyacrylonitrile fibres a red dyeing having good fastness properties.

The following dye salts are obtained in an analogous manner:

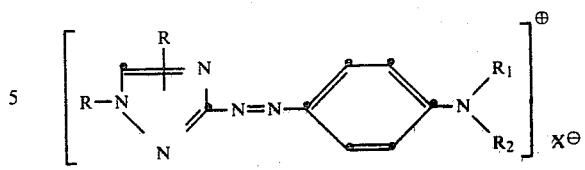
5.

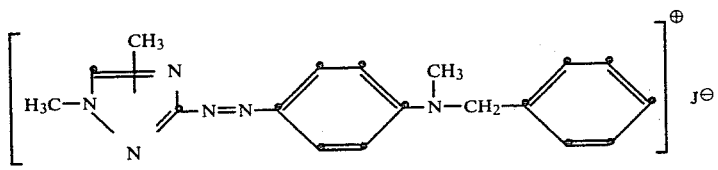
6.

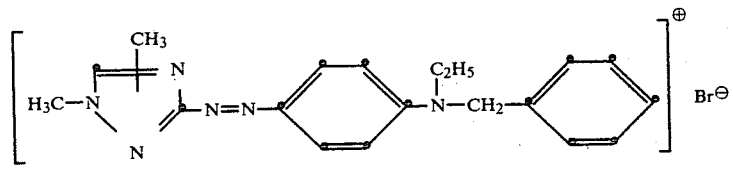
7.

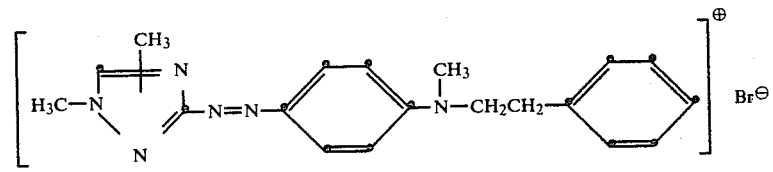
8.

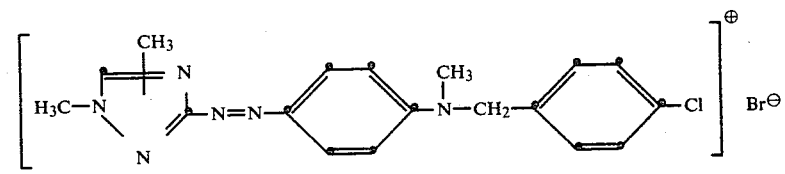
9.

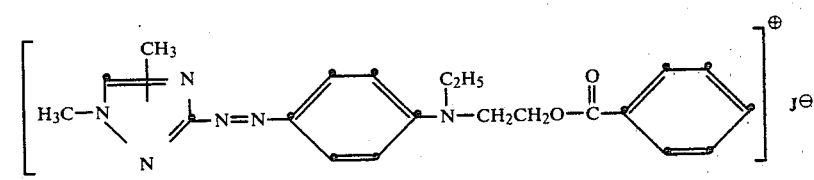
10.

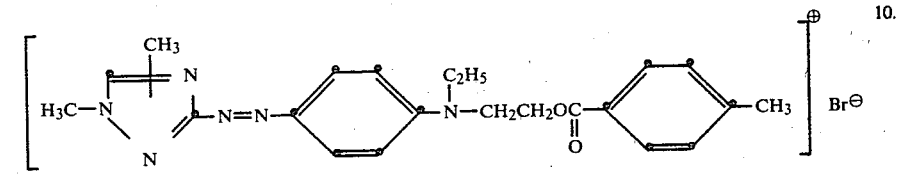
11.

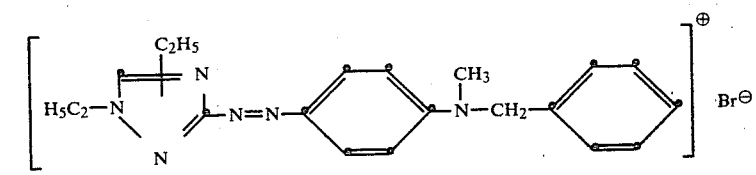
12.

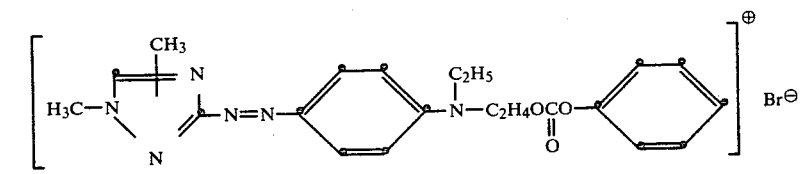

What is claimed is:
1. A crystalline salt of a triazole dye of the formula wherein
R is the CH$_3$ or C$_2$H$_5$ group,
R$_1$ is a C$_1$–C$_4$-alkyl group, $R_2$ is an unsubstituted or substituted $C_1$-$C_4$-alkyl group, and X is the bromine or iodine ion.

2. A triazole dye of claim 1, wherein $R_2$ is a substituted $C_1$-$C_4$-alkyl group.

3. A triazole dye of claim 1, wherein R is the $CH_3$ group.

4. A triazole dye of claim 1, wherein $R_1$ is the $CH_3$ or $C_2H_5$ group.

5. A triazole dye of claim 1, wherein $R_2$ is a $C_1$-$C_4$-alkyl group substituted by phenyl or by a benzoyloxy group.

6. A triazole dye of claim 1, wherein $R_2$ is the benzyl group.

7. A triazole dye of claim 1, wherein $R_2$ is the benzoyloxy ethyl group.

8. A triazole dye of claim 1, wherein X is the bromine ion.

9. A triazole dye of the formula I according to claim 1, wherein R and $R_1$ are each the $CH_3$ group, and $R_2$ is the benzyl group.

10. A process for producing a triazole dye, comprising the step of reacting an alkylsulfate salt of the formula $$\left[ \begin{array}{c} R \\ R-N \diagup\hspace{-0.3em}\diagdown N \\ \hspace{1em} \diagdown N \diagup \end{array} -N=N- \bigcirc -N \begin{array}{c} R_1 \\ R_2 \end{array} \right]^{\oplus} RSO_4^{\ominus}$$

with hydrobromic acid or hydriodic acid, or with an ammonium, alkali metal or alkaline-earth metal salt thereof, to give a triazole dye of the formula $$\left[ \begin{array}{c} R \\ R-N \diagup\hspace{-0.3em}\diagdown N \\ \hspace{1em} \diagdown N \diagup \end{array} -N=N- \bigcirc -N \begin{array}{c} R_1 \\ R_2 \end{array} \right]^{\oplus} X^{\ominus}$$

wherein, in both formulas above,

R is the $CH_3$ or $C_2H_5$ group,
$R_1$ is a $C_1$-$C_4$-alkyl group,
$R_2$ is an unsubstituted or substituted $C_1$-$C_4$-alkyl group, and
X is the bromine or iodine ion.

11. A process according to claim 10, wherein the reaction is performed at room temperature.

12. A process of dyeing or printing a textile which is dyeable with cationic dyes, comprising the step of contacting the textile with a dye of the formula $$\left[ \begin{array}{c} R \\ R-N \diagup\hspace{-0.3em}\diagdown N \\ \hspace{1em} \diagdown N \diagup \end{array} -N=N- \bigcirc -N \begin{array}{c} R_1 \\ R_2 \end{array} \right]^{\oplus} X^{\ominus}$$

wherein

R is the $CH_3$ or $C_2H_5$ group,
$R_1$ is a $C_1$-$C_4$-alkyl group,
$R_2$ is an unsubstituted or substituted $C_1$-$C_4$-alkyl group, and
X is the bromine or iodine ion.

* * * * *